US010922087B2

(12) United States Patent
Karve et al.

(10) Patent No.: US 10,922,087 B2
(45) Date of Patent: Feb. 16, 2021

(54) BLOCK BASED ALLOCATION AND DEALLOCATION OF ISSUE QUEUE ENTRIES

(71) Applicant: International Business Machines Corporation, Armonk, NY (US)

(72) Inventors: Mohit S. Karve, Austin, TX (US); Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/826,740

(22) Filed: Nov. 30, 2017

(65) Prior Publication Data

US 2019/0163489 A1 May 30, 2019

(51) Int. Cl.
*G06F 9/30* (2018.01)
*G06F 9/38* (2018.01)

(52) U.S. Cl.
CPC .......... *G06F 9/3855* (2013.01); *G06F 9/3867* (2013.01)

(58) Field of Classification Search
None
See application file for complete search history.

(56) References Cited

U.S. PATENT DOCUMENTS 5,655,096 A 8/1997 Branigin
5,689,674 A 11/1997 Griffith et al.
5,710,902 A 1/1998 Sheaffer et al.
6,065,105 A 5/2000 Zaidi
6,336,183 B1 1/2002 Le et al.
6,425,074 B1 7/2002 Meier et al.
(Continued)

FOREIGN PATENT DOCUMENTS

CN 101034345 A 9/2007
CN 102360309 A 2/2012

OTHER PUBLICATIONS

Joel A. Silberman, et al., Pending U.S. Appl. No. 15/826,734 entitled "Scalable Dependency Matrix With a Single Summary Bit in an Out-Of-Order Processor," filed Nov. 30, 2017.
(Continued)

*Primary Examiner* — Corey S Faherty
(74) *Attorney, Agent, or Firm* — Cantor Colburn LLP; Jason Sosa

(57) ABSTRACT

Aspects of the invention include tracking relative ages of instructions in an issue queue of an OoO processor. The tracking includes grouping entries in the issue queue into a pool of blocks, each block containing two or more entries that are configured to be allocated and deallocated as a single unit, each entry configured to store an instruction. Blocks are selected in any order from the pool of block for allocation. The selected blocks are allocated and the relative ages of the allocated blocks are tracked based at least in part on an order that the blocks are allocated. Each allocated block is configured as a first-in-first-out (FIFO) queue of entries, configured to add instructions to the block in a sequential order, and configured to remove instructions from the block in any order including a non-sequential order. The relative ages of instructions within each allocated block are tracked.

20 Claims, 12 Drawing Sheets

1000
4020
HEAD POINTER
TAIL POINTER
4040
4022
HEAD POINTER
TAIL POINTER
4042
1
3
9
10
11
12
7020
7021
7022
706

(56) References Cited

U.S. PATENT DOCUMENTS

| | | | | |
|---|---|---|---|---|
| 6,463,523 | B1 | 10/2002 | Kessler et al. | |
| 6,553,480 | B1 | 4/2003 | Cheong | |
| 6,557,095 | B1 | 4/2003 | Henstrom | |
| 6,728,866 | B1 | 4/2004 | Kahle et al. | |
| RE38,599 | E | 9/2004 | Tremblay | |
| 6,862,676 | B1 | 3/2005 | Knapp et al. | |
| 6,931,639 | B1 | 8/2005 | Eickemeyer | |
| 6,988,183 | B1 | 1/2006 | Wong | |
| 6,988,186 | B2 * | 1/2006 | Eickemeyer .......... | G06F 9/3802 712/217 |
| 7,133,925 | B2 | 11/2006 | Mukherjee et al. | |
| 7,219,249 | B1 | 5/2007 | Ghose | |
| 7,464,253 | B2 | 12/2008 | Viedenbaum et al. | |
| 7,472,258 | B2 | 12/2008 | Burky | |
| 7,689,812 | B2 | 3/2010 | Abernathy et al. | |
| 8,127,116 | B2 | 2/2012 | Islam et al. | |
| 3,285,974 | A1 | 10/2012 | Singh et al. | |
| 8,392,672 | B1 | 3/2013 | Rhoades et al. | |
| 8,521,998 | B2 | 8/2013 | Albernathy et al. | |
| 8,667,260 | B2 | 3/2014 | Eichenberger et al. | |
| 8,930,432 | B2 | 1/2015 | Hickey et al. | |
| 9,047,079 | B2 | 6/2015 | Bruce et al. | |
| 9,058,180 | B2 | 6/2015 | Golla et al. | |
| 9,146,774 | B2 | 9/2015 | Busaba et al. | |
| 9,158,573 | B2 | 10/2015 | Busaba et al. | |
| 9,298,466 | B2 | 3/2016 | Buyuktosunoglu et al. | |
| 9,489,207 | B2 | 11/2016 | Burky et al. | |
| 9,513,924 | B2 | 12/2016 | Gschwind et al. | |
| 9,619,383 | B2 | 4/2017 | Busaba et al. | |
| 2002/0053038 | A1 | 5/2002 | Buyuktosunoglu et al. | |
| 2003/0069920 | A1 | 4/2003 | Melvin et al. | |
| 2004/0177239 | A1 | 9/2004 | Clift et al. | |
| 2004/0215938 | A1 | 10/2004 | Burky | |
| 2005/0038979 | A1 | 2/2005 | Fischer et al. | |
| 2005/0243734 | A1 | 11/2005 | Nemirovsky et al. | |
| 2006/0095732 | A1 | 5/2006 | Tran | |
| 2009/0100249 | A1 | 4/2009 | Eichenberger et al. | |
| 2009/0113181 | A1 | 4/2009 | Comparan et al. | |
| 2009/0276608 | A1 | 11/2009 | Shimada | |
| 2010/0095087 | A1 | 4/2010 | Eichenberger et al. | |
| 2010/0161942 | A1 | 6/2010 | Bishop | |
| 2010/0262806 | A1 | 10/2010 | Doing | |
| 2011/0153986 | A1 | 6/2011 | Alexander et al. | |
| 2011/0302392 | A1 | 12/2011 | Abernathy et al. | |
| 2012/0233441 | A1 * | 9/2012 | Barreh .................. | G06F 9/3814 712/206 |
| 2013/0205118 | A1 | 8/2013 | Buyuktosunoglu et al. | |
| 2014/0351562 | A1 | 11/2014 | Spadini | |
| 2015/0106595 | A1 | 4/2015 | Khot et al. | |
| 2015/0220342 | A1 | 8/2015 | Glossner | |
| 2016/0117172 | A1 | 4/2016 | Alexander et al. | |
| 2016/0202988 | A1 | 7/2016 | Ayub et al. | |
| 2017/0132010 | A1 | 5/2017 | Vasekin et al. | |
| 2017/0235577 | A1 | 8/2017 | Brownscheidle | |
| 2017/0344374 | A1 | 11/2017 | Friedmann | |
| 2018/0232234 | A1 | 8/2018 | Alexander | |
| 2019/0163482 | A1 | 5/2019 | Silberman | |
| 2019/0163483 | A1 | 5/2019 | Silberman | |
| 2019/0163484 | A1 | 5/2019 | Silberman | |
| 2019/0163485 | A1 | 5/2019 | Karve | |
| 2019/0163486 | A1 | 5/2019 | Sinharoy | |
| 2019/0163488 | A1 | 5/2019 | Karve | |
| 2019/0163489 | A1 | 5/2019 | Karve | |
| 2019/0163490 | A1 | 5/2019 | Silberman | |
| 2019/0163491 | A1 | 5/2019 | Silberman | |
| 2020/0150969 | A1 | 5/2020 | Silberman et al. | |

OTHER PUBLICATIONS

Joel A. Silberman, et al., Pending U.S. Appl. No. 15/826,742 entitled "Scalable Dependency Matrix With Wake-Up Columns for Long Latency Instructions in an Out-Of-Order Processor," filed Nov. 30, 2017.

Joel A. Silberman, et al., Pending U.S. Appl. No. 15/826,746 entitled "Scalable Dependency Matrix With Multiple Summary Bits in an Out-Of-Order Processor," filed Nov. 30, 2017.

Joel A. Silberman, et al., Pending U.S. Appl. No. 15/826,754 entitled "Completing Coalesced Global Completion Table Entries in an Out-Of-Order Processor," filed Nov. 30, 2017.

Joel A. Silberman, et al.., Pending U.S. Appl. No. 151826,752 entitled "Coalescing Global Completion Table Entries in an Out-Of-Order Processor," filed Nov. 30, 2017.

List of IBM Patents or Patent Applictions Treated as Related; (Appendix P), Filed Nov. 30, 2017.

Mohit Karve, et al., Pending U.S. Appl. No. 15/826,738 entitled "Head and Tail Pointer Manipulation in a First-In-First-Out Issue Queue," filed Nov. 30, 2017.

U.S. Appl. No. 15/826,741, filed Nov. 30, 2017, Entitled: Buffered Instruction Dispatching to an Issue Queue, First Named Inventor: Mohit S. Karve.

U.S. Appl. No. 15/826,745, filed Nov. 30, 2017, Entitled: Issue Queue With Dynamic Shifting Between Ports, First Named Inventor: Balaram Sinharoy.

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.

Anonymously; "An extensible, scalable, optimized multithreaded data loading framework for software applications"; http://ip.com/IPCOM/000240374D; Jan. 28, 2015, 8 pages.

Anonymously; "Method and Apparatus for Hardware Assisted Function Shipping"; http://ip.com/IPCOM/000199436D; Sep. 3, 2010, 7 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Daniele Folegnani et al., "Energy Effective Issue Logic" ISCA '01, Proceedings of the 28th annual international symposium on Computer architechture, pp. 230-239 (Year:2001).

Duong et al., "Compiler Assisted Out-Of-Order Instruction Commit." Center for Embedded Computer Systems, University of California, Irvine (2010), 27 pages.

Ergin et al. "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 pages.

IBM; "Instruction Steering Policy for Balanced Utilization of a Biburcated Unified Issue Queue"; http://ip.com/IPCOM/000179961D; Mar. 3, 2009, 3 pages.

International Search Report and Written Opinion for International Application No. PCT/IB2018/058800; International Filing Date: Nov. 9, 2018; dated Feb. 27, 2019, 9 pages.

International Search Report and Written Opinion for International Application No. PCT/IB2018/058801, International Filing Date: Nov. 9, 2018; dated Jan. 21, 2019, 9 pages.

International Search Report/Written Opinion for International Application No. PCT/IB2018/058799, International Filing Date: Nov. 9, 2018; dated Feb. 12, 2019, 9 pages.

Koufaty et al., "Hyperthreading technology in the netburst microarchitecture." IEEE Micro 23.2 (2003): pp. 56-65.

Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.

Mericas, A.; "Performance Characteristics of the POWER8 Processor"; IBM Corporation, IBM Systems & Technology Group Development; 2014, 26 pages.

(56) References Cited

OTHER PUBLICATIONS

Ramírez et al., "Direct Instruction Wakeup for Out-Of-Order Processors," Proc Innovative Architecture for Future Generation High-Performance Processors and Systems, IEEE, 2004, 8 pages.
Shum et al., "IBM zEC12: The third-generation high-frequency mainframe microprocessor." Ieee Micro 33.2 (2013): pp. 38-47.
Subramaniam et al., "Store Vectors for Scalable Memory Dependence Prediction and Scheduling," Proc of the 12th Intl Symp on High-Performance Computer Architecture, IEEE, 2006, 12 pages.
Tendler, JM. et al.; "POWER4 System microarchitecture"; IBM Corporation, IBM Research & Development; vol. 46, No. 1; Jan. 2002, 21 pages.

* cited by examiner

BLOCK BASED ALLOCATION AND DEALLOCATION OF ISSUE QUEUE ENTRIES

BACKGROUND

Embodiments of the invention relate in general to an out-of-order (OoO) processor and more specifically to block based allocation and deallocation of issue queue entries in an issue queue of an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. The ISU includes one or more issue queues that are used to track the instructions as they get ready to be issued to the instruction units and until they are past a point where they may need to be reissued.

SUMMARY

Embodiments of the invention include methods, systems, and computer program products for implementing block based allocation and deallocation of issue queue entries in an issue queue of an out-of-order (OoO) processor. A non-limiting example method includes tracking relative ages of instructions in an issue queue of the OoO processor. The tracking includes grouping entries in the issue queue into a pool of blocks, each block containing two or more entries that are configured to be allocated and deallocated as a single unit, each entry configured to store an instruction. Blocks are selected in any order from the pool of block for allocation. The selected blocks are allocated and the relative ages of the allocated blocks are tracked based at least in part on an order that the blocks are allocated. Each allocated block is configured as a first-in-first-out (FIFO) queue of entries, configured to add instructions to the block in a sequential order, and configured to remove instructions from the block in any order including a non-sequential order. The relative ages of instructions within each allocated block are tracked.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
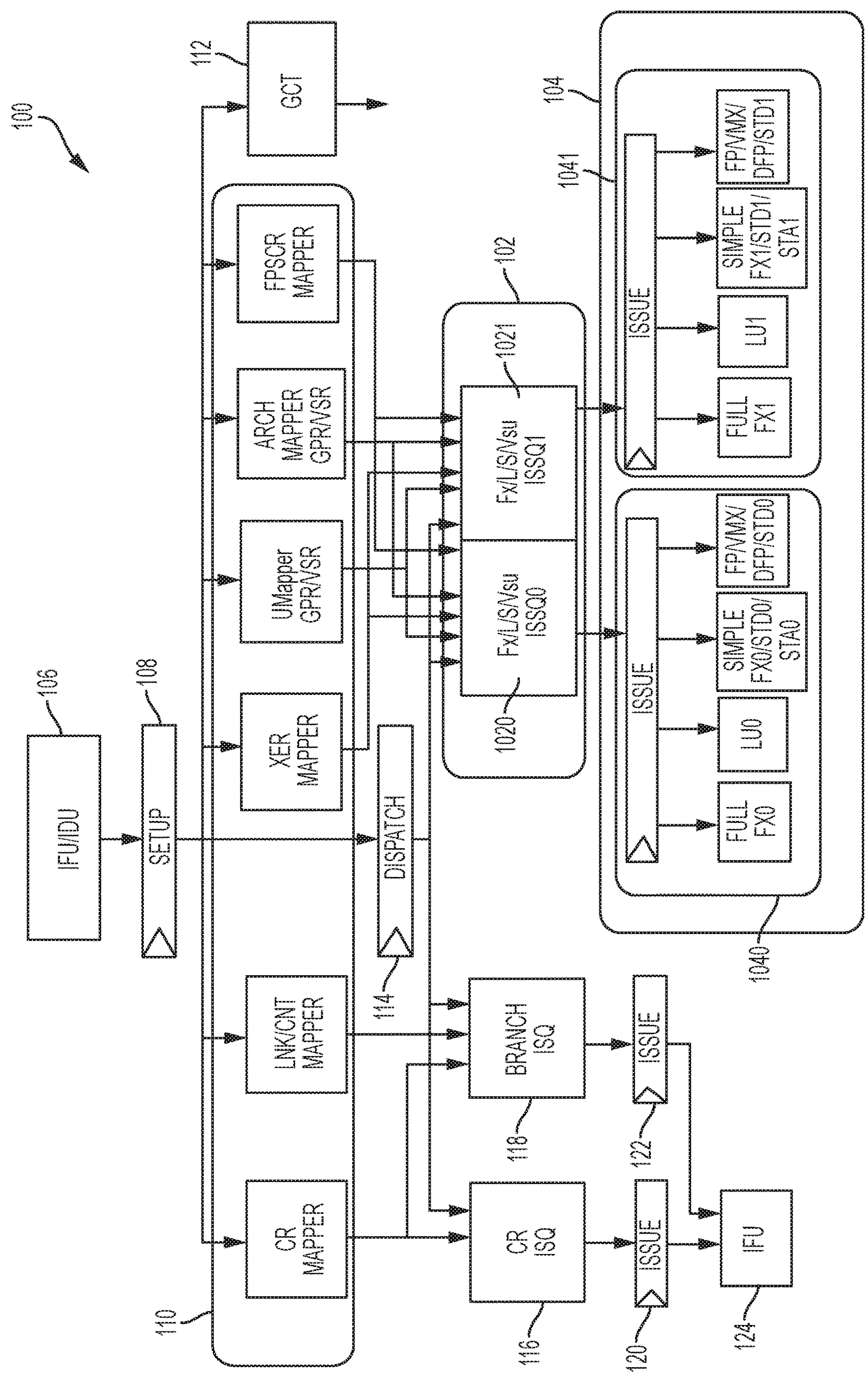
FIG. 1 is a block diagram of a system that includes an instruction sequencing unit (ISU) of an out-of-order (OoO) processor in accordance with one or more embodiments of the invention.

One or more embodiments of the invention described herein provide block based allocation and deallocation of issue queue entries in an issue queue of an out-of-order (OoO) processor. In accordance with one or more embodiments of the present invention, issue queue entries are allocated in blocks, or groups, of issue queue entries to create contiguous issue queue slots for future dispatch. When instructions from two or more threads are contained in an issue queue, each block can be assigned to a particular thread. The allocation of entries in the issue queue in blocks can allow the creation of contiguous issue queue slots for future dispatch because blocks of entries are freed up as each thread issues instructions.

In accordance with one or more embodiments of the present invention, the blocks are selected and allocated in a random order from a pool of available blocks of entries in the issue queue and the blocks are tracked using a linked list. If an intermediate block in the issue queue is completely issued (e.g., no entries in the block correspond to a valid instructions) then the intermediate block may be deallocated for reuse by the same thread or a different thread using the linked list structure. In this embodiment, each block of entries can be configured as a first-in-first-out (FIFO) queue for tracking the relative ages of instructions within the block. In place of, or in combination with, the linked list, a reduced size age array can be utilized to track the relative ages of the blocks. For example, if an issue queue contains N entries and each block contains four entries, then the size of the reduced size age array is (N/4 rows)*(N/4 columns) instead of N rows*N columns for an age array in a traditional OoO issue queue.

The relative ages of the allocated blocks can be tracked based at least in part on an order that the blocks are allocated. The blocks can be selected from the pool for allocation in a sequential order based on the position of the blocks in the issue queue. Alternatively, the blocks can be selected from the pool for allocation in a random order and not based on the position of the blocks in the issue queue.

In accordance with one or more embodiments of the present invention, a reduced size age array and/or linked list is utilized for tracking the relative ages of the allocated blocks. Each allocated block can be configured as a FIFO block and configured to add instructions to the block in a sequential order and to remove instructions from the block in any order. The relative ages of instructions within each allocated block can be tracked by maintaining a tail pointer to a location of a last instruction added to the allocated block, and upon addition of a new instruction to the allocated block, the tail pointer is updated to point to a next sequential location in the allocated block and the new instruction is inserted at the next sequential location in the allocated block. If the tail pointer is at the last sequential location in the allocated block, then a new block can be allocated for the new instruction. In addition, a head pointer to a location of an oldest instruction in the allocated block can be maintained, where upon removal of the oldest instruction from the allocated block, the head pointer is updated to point to a next sequential location in the allocated block. Once all of the instructions have been removed from the block, the block can be deallocated and added to the pool of blocks that are available for allocation.

In accordance with one or more embodiments of the invention, a new block is selected from the pool of blocks and allocated based at least in part on receiving a new instruction to be added to the issue queue and to determining that the new instruction cannot be added to a previously allocated block (e.g., the most recently allocated block for the thread). A block can be deallocated and added to the pool of blocks when none of the entries in the allocated block correspond to valid instructions. An instruction is valid, for example, when it has been added to the issue queue and has not passed the rejection point (i.e., there is a possibility that the instruction may need to be reissued) and it has not been flushed, completed or retired. An instruction is not valid, for example, when it has been removed from the issue queue, passed the rejection point, has been flushed, has been completed, or has been retired. Instructions are removed from the issue queue once they have issued and it is known that there will not be a need to reissue the instruction at a future time.

In accordance with one or more embodiments of the present invention, all of the instructions in the issue queue are from a single thread, and thus the instructions in each of the entries of each of the blocks are from the single thread. In accordance with one or more other embodiments of the present invention, the instructions in the issue queue are from a plurality of threads (e.g., two, four). The entries in a first block can correspond to a first thread and the entries in a second block to a second thread. In accordance with one or more embodiments of the present invention, the relative ages of blocks having entries corresponding to the first thread are tracked separately from the relative ages of blocks having entries corresponding to the second thread.

Turning now to FIG. 1, a block diagram of a system 100 that includes an instruction sequencing unit (ISU) of an out-of-order (OoO) processor is generally shown according to one or more embodiments of the invention. The system 100 shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper GPR/VSR, ARCH Mapper GPR/VSR, and FPSCR mapper are input to issue queue 102. As shown in FIG. 1, issue queue 102 tracks issued floating point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding forty-eight instructions. When the processor is executing in ST mode, the issue queue 102 can be used as a single logical issue queue that contains both ISQ0 1020 and ISQ1 1021 to process all of the instructions (in this example all ninety-six instructions) of a single thread.

When the processor is executing in MT mode, ISQ0 1020 can be used to process forty-eight instructions from a first thread and ISQ1 1021 is used to process forty-eight instructions from a second thread ISQ1 1021.

As shown in FIG. 1, issue queue 102 issues instructions to execution units 104 which are split into two groups of execution units 1040 1041. Both groups of execution units

1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
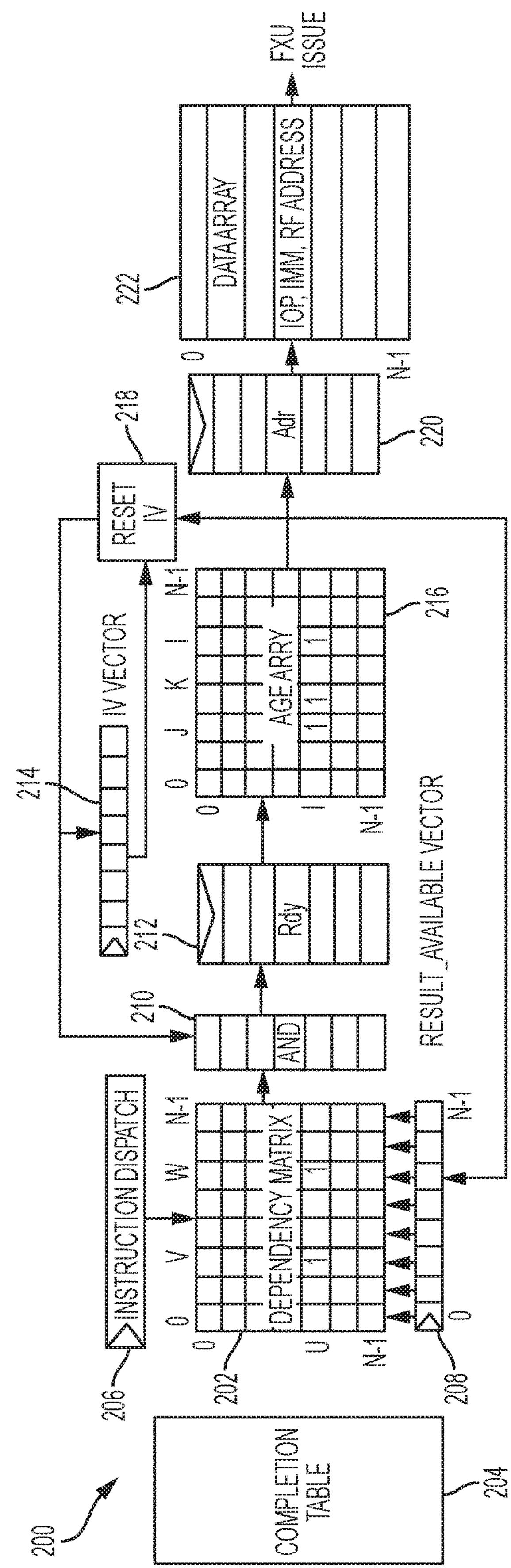
FIG. 2 is a block diagram of an issue queue in an ISU of an OoO processor in accordance with one or more embodiments of the invention.

Turning now to FIG. 2, a block diagram of an issue queue 200 is generally shown according to one or more embodiments of the invention. The issue queue 200 shown in FIG. 2 includes matrices, tables, and vectors for tracking instructions that are waiting to be issued. The matrices and tables each include a corresponding row for each instruction being tracked, and the vectors include an entry for instructions being tracked. As the number of instructions in the issue queues continues to increase, the amount of space and power taken up by each of the matrices, tables, and vectors is growing. Embodiments of the invention described herein can be used to eliminate or reduce the size of the age array 216 by using block based allocation and deallocation of issue queue entries.

The issue queue 200 tracks instructions that are waiting for execution by an execution unit. An instruction is dispatched and allocated to the issue queue 200 (e.g., CR ISQ 116, Branch ISQ 118, issue queue 102). The instruction is ready to issue from the issue queue 200 when its dependencies are satisfied, that is when the instructions have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point the instruction can be removed from the issue queue and the corresponding entry in the issue queue is cleared for reuse by a new instruction. The instruction finishes once the execution of the instruction, by an execution unit, has completed.

The issue queue 200 shown in FIG. 2 includes: a dependency matrix 202 for tracking dependencies between instructions in the issue queue 200; a completion table 204 for indicating that the execution of an instruction has passed the rejection point and the instruction can be deallocated from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 214 that indicates the instructions that are valid and issuable; AND logic 210 that logically ANDs the output of the dependency matrix with the IV vector; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updated the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "u" depends on the instructions at position "v" and "w". The dependency matrix 202 and the age array 216 shown in FIG. 2 have N rows and N columns, one row and column for each instruction in the issue queue. As shown in the age array 216 of FIG. 2, instructions at entry positions "j", "k", and "l" are older than the instruction at entry position "i".

Instructions stored in the structures (e.g., tables, matrices, arrays, and/or vectors) of an issue queue such as the one shown in FIG. 2 are typically indexed by a common index. For example, an index may point to a second row in a dependency matrix, a second entry in a result available indicator vector, and a second row in a data array which all correspond to the same instruction in the issue queue. For ease of description, the indices will be described herein as pointing to entries in an issue queue and it should be understood that this can include corresponding locations in all or a subset of the structures of the issue queue.

Figure 3:
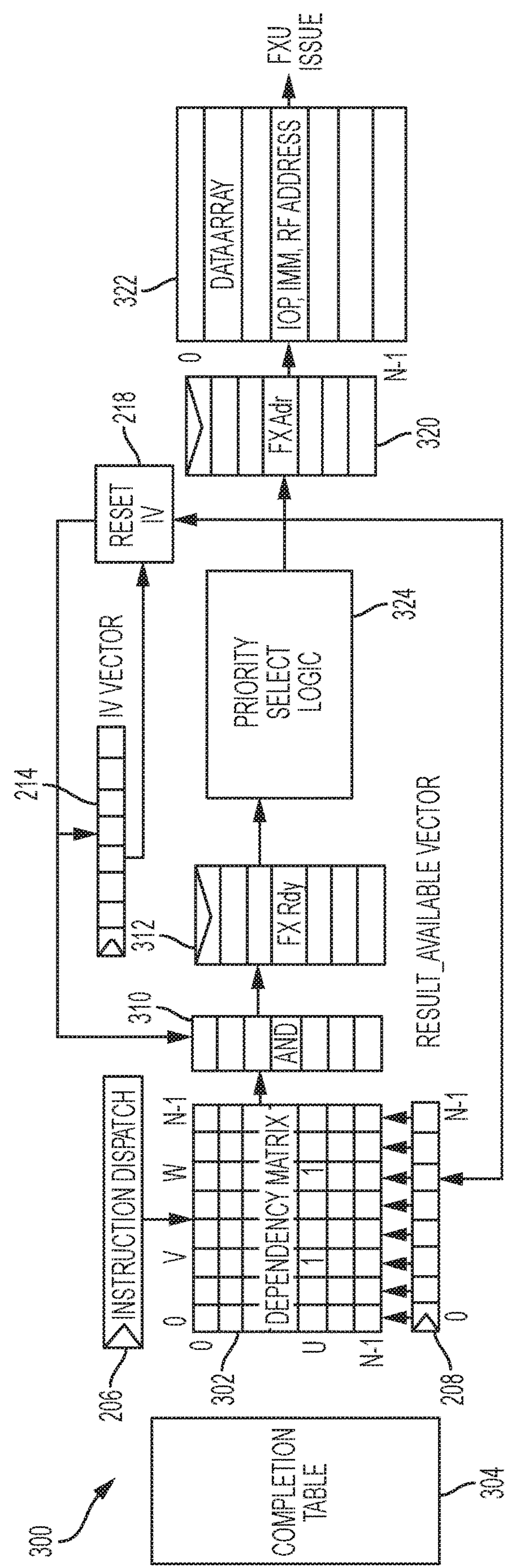
FIG. 3 is a block diagram of an issue queue in an ISU of an OoO processor for performing block based allocation and deallocation of issue queue entries in accordance with one or more embodiments of the invention.

Turning now to FIG. 3, a block diagram of a FIFO issue queue 300 in an ISU of an OoO for implementing block based allocation and deallocation is generally shown in accordance with one or more embodiments of the invention. The issue queue 300 shown in FIG. 3 is similar to the issue queue 200 described above with reference to FIG. 2 except that the instructions are inserted into the matrices, tables, and vectors in FIFO order and there is no need for the logic or circuitry associated with the age array 216 shown in FIG. 2 because the instructions are inserted into the matrices, tables, and vectors in the order that they were received. In place of the age array 216 of FIG. 2, the issue queue 300 shown in FIG. 3 includes priority select logic 324 for issuing instructions in optimal order for the highest performance. Thus, the dependency matrix 302, completion table 304, AND vector 310, ready vector 312, address 320, and data array 322 contain corresponding entries that are in the order that they were received from the instruction dispatch unit 206.

Figure 4:
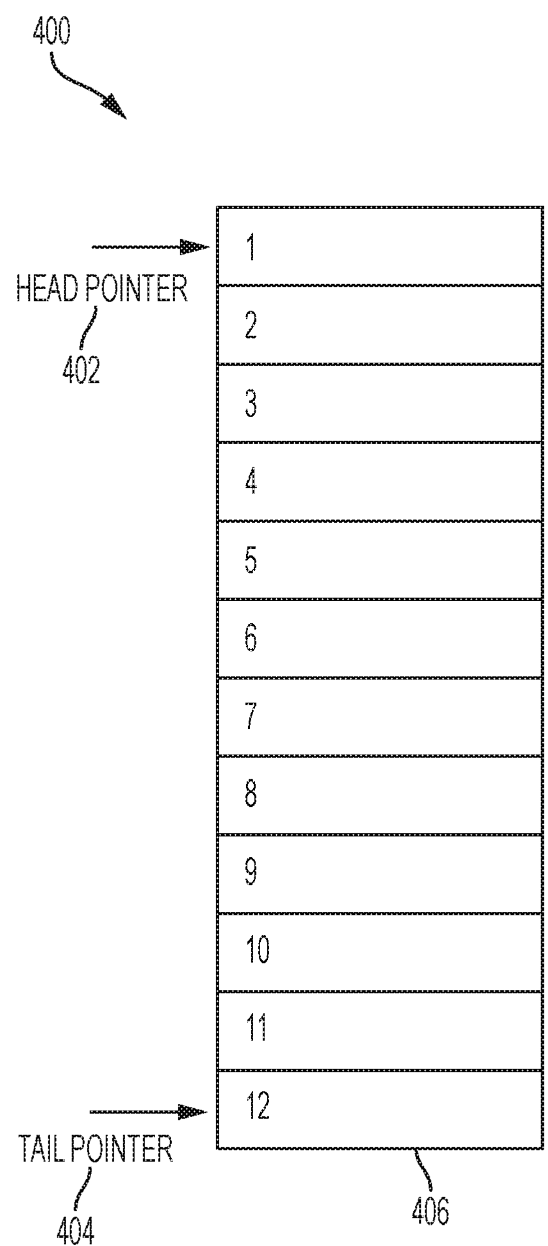
FIG. 4 is a block diagram of head and tail pointers to entries in a FIFO issue queue in accordance with one or more embodiments of the invention.

Turning now to FIG. 4, a block diagram 400 of head and tail pointers to entries in a FIFO issue queue for a single thread is generally shown in accordance with one or more embodiments of the invention. As shown in FIG. 4, a head pointer 402 is pointing to a location in an issue queue 406, such as issue queue 300 in FIG. 3, which corresponds to instruction “1”. The head pointer 402 points to the entry that corresponds to the oldest instruction in the issue queue 406. FIG. 4 also includes a tail pointer 404 that points to the location of the entry that includes instruction “12” which is the instruction that was most recently added to the issue queue 406 (the newest instruction in the issue queue). The issue queue 406 shown in FIG. 4 is full as all of the entries are allocated and contain valid instructions numbered 1 through 12. In accordance with one or more embodiments, the instructions were added to the issue queue 406 in the sequence indicated by their number, that is, instruction “1” was added first, instruction “2” was added second, and so on to instruction “1” which was added twelfth.

Figure 5:
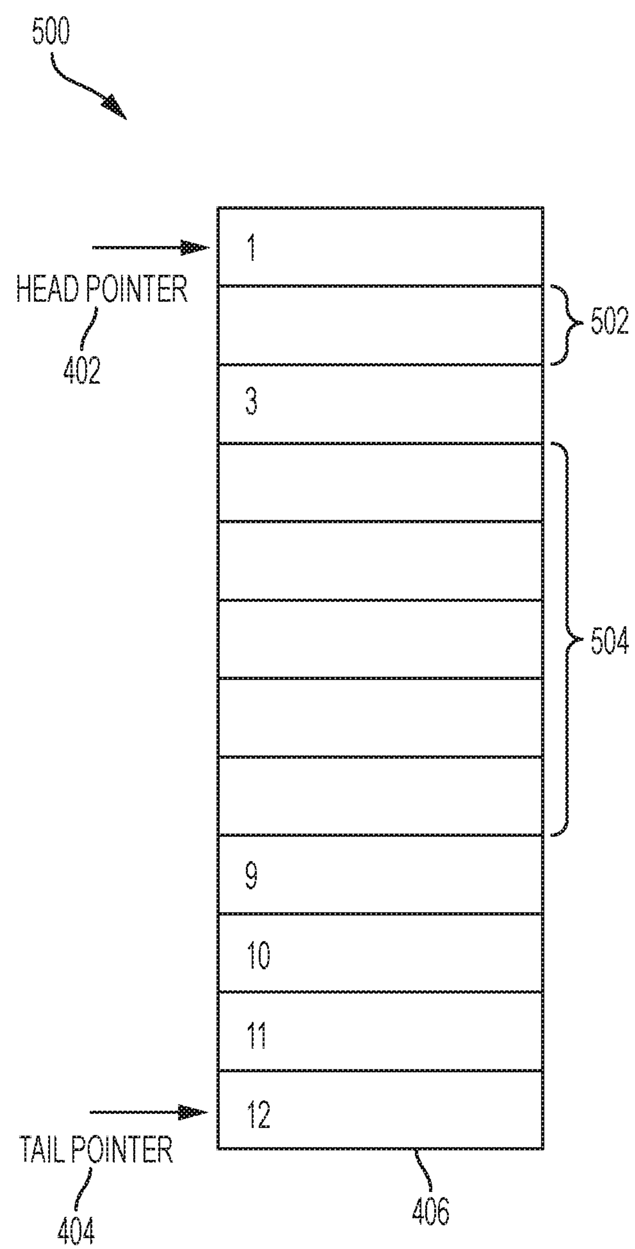
FIG. 5 is a block diagram of head and tail pointers to entries in a FIFO issue queue in accordance with one or more embodiments of the invention.

Turning now to FIG. 5, a block diagram 500 of head and tail pointers to entries in the FIFO issue queue 406 of FIG. 4 after instructions “2” and “4” through “8” have been removed from the issue queue 406 is generally shown in accordance with one or more embodiments of the invention. As shown in FIG. 5, the head pointer 402 is pointing to a location of the oldest instruction in the issue queue 406, instruction “1”. FIG. 5 also includes the tail pointer 404 that points to the location in the issue queue 406 that includes instruction “12” which is the instruction that was most recently added to the issue queue (also referred to as the “youngest instruction” in the issue queue). As shown in FIG. 5, the issue queue 406 is not full, as instruction “2” at entry location 502 and instructions “4” through “8” at entry locations 504 were removed from the issue queue following successful OoO issue. These entries are between the head pointer 402 and the tail pointer 404. Issue queue 406 has six empty slots, but none of them can be used until after the entry allocated to instruction “1” is deallocated and becomes available for reuse. Thus, as shown in FIG. 5, the issue queue 406 is only fifty percent full but it appears, based on the head pointer 402 and the tail pointer 404, that the issue queue 406 is one-hundred percent full. As a consequence, no additional instructions can be dispatched into the issue queue 406 even through the issue queue 406 is only half full.

Figure 6:
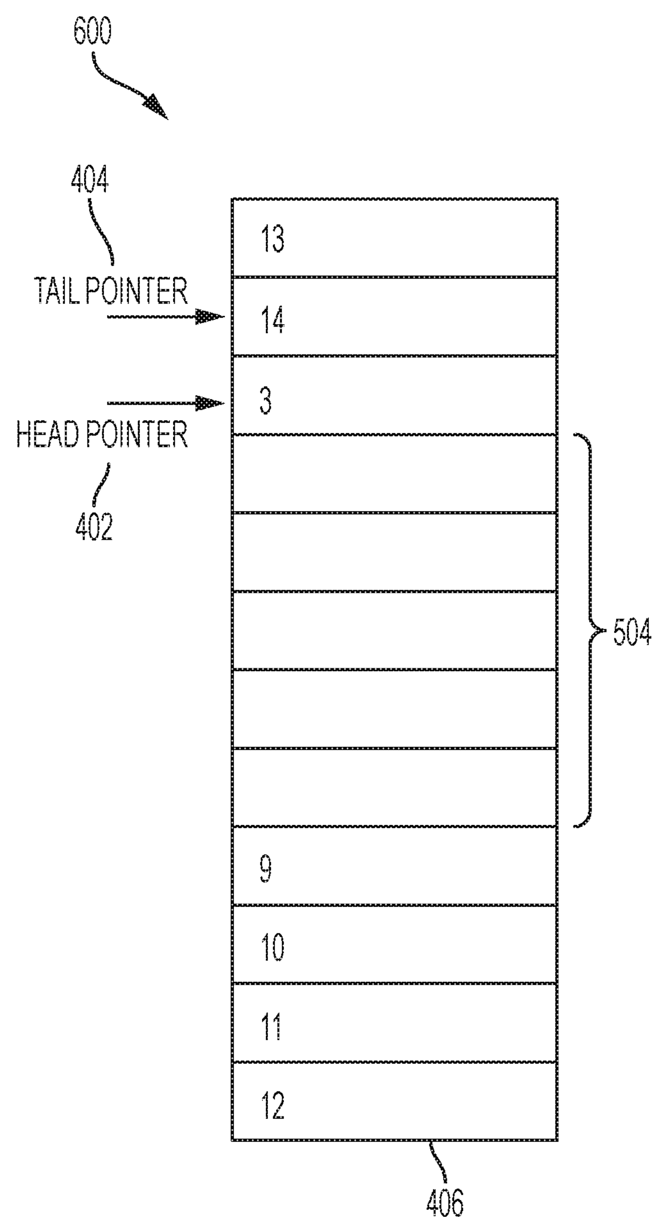
FIG. 6 is a block diagram of head and tail pointers to entries in a FIFO issue queue in accordance with one or more embodiments of the invention.

Turning now to FIG. 6, a block diagram 600 of head and tail pointers to entries in the FIFO issue queue 406 of FIG. 5 after instructions have been removed and new instructions added is generally shown in accordance with one or more embodiments of the invention. As shown in FIG. 6, after instruction “1” issues and is removed from the issue queue 406, only two additional instructions, shown as instructions “13” and “14” can be dispatched until instruction “3” issues and is removed from the issue queue 406. As a consequence, no additional instructions can be dispatched into the issue queue 406 even though five out of 12 of the entries in the issue queue 406 do not contain valid instructions.

Figure 7:
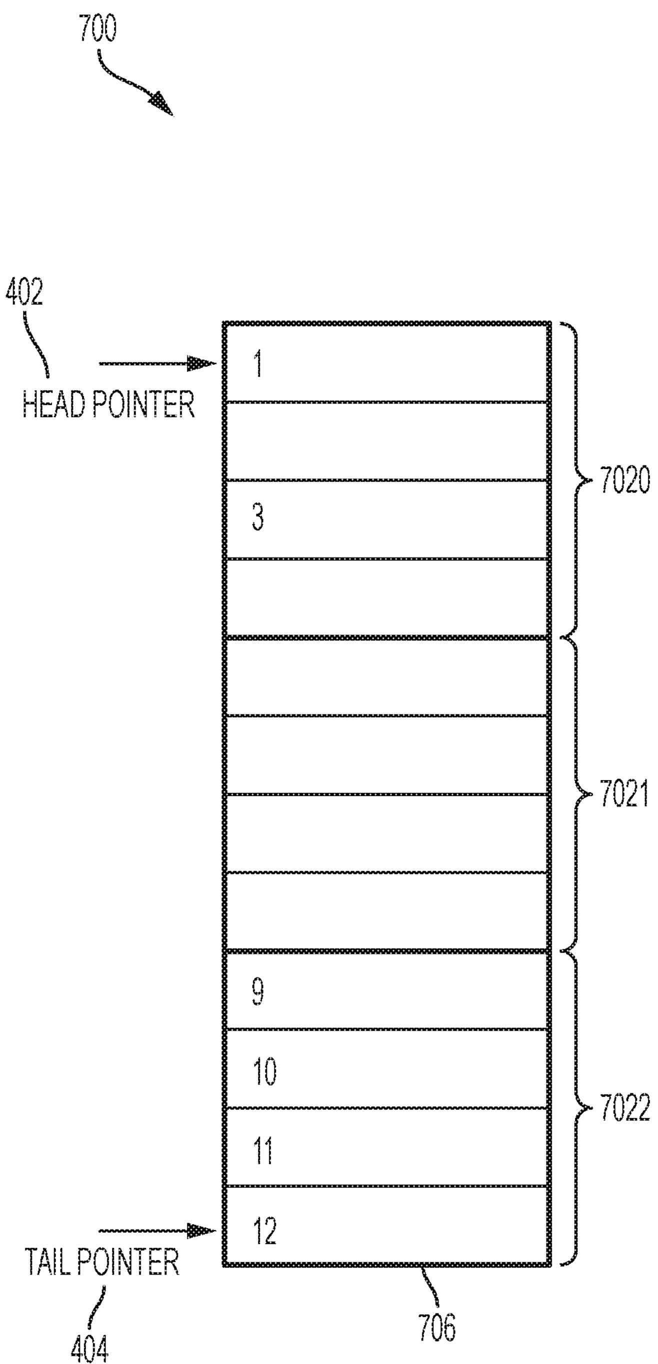
FIG. 7 is a block diagram of an issue queue in an ISU of an OoO processor for performing block based allocation and deallocation of issue queue entries in accordance with one or more embodiments of the invention.

Turning now to FIG. 7, a block diagram 700 of an issue queue in an ISU of an OoO processor for performing block based allocation and deallocation of issue queue entries is generally shown in accordance with one or more embodiments of the invention. FIG. 7. As shown in FIG. 7, the entries in the issue queue 706 are grouped into blocks 7020 7021 7022, with each block containing four entries. In accordance with one or more embodiments of the invention, the four entries in each of the blocks 7020 7021 7022 are allocated and deallocated as a single unit, that is, all four entries are allocated and deallocated in response to the same request and/or at the same time. The configuration shown in FIG. 7 is similar to FIG. 6, however, in the configuration shown in FIG. 7, there is a higher likelihood, when compared to the configuration shown in FIG. 6, that dispatch will have four entries (or whatever number of entries are contained in each block) available for adding instructions to the issue queue 706. This is more power efficient as four instructions can be dispatched every two to three cycles and the dispatch logic does not need to be on for every cycle (i.e., because dispatching is not performed in every cycle).

Figure 8:
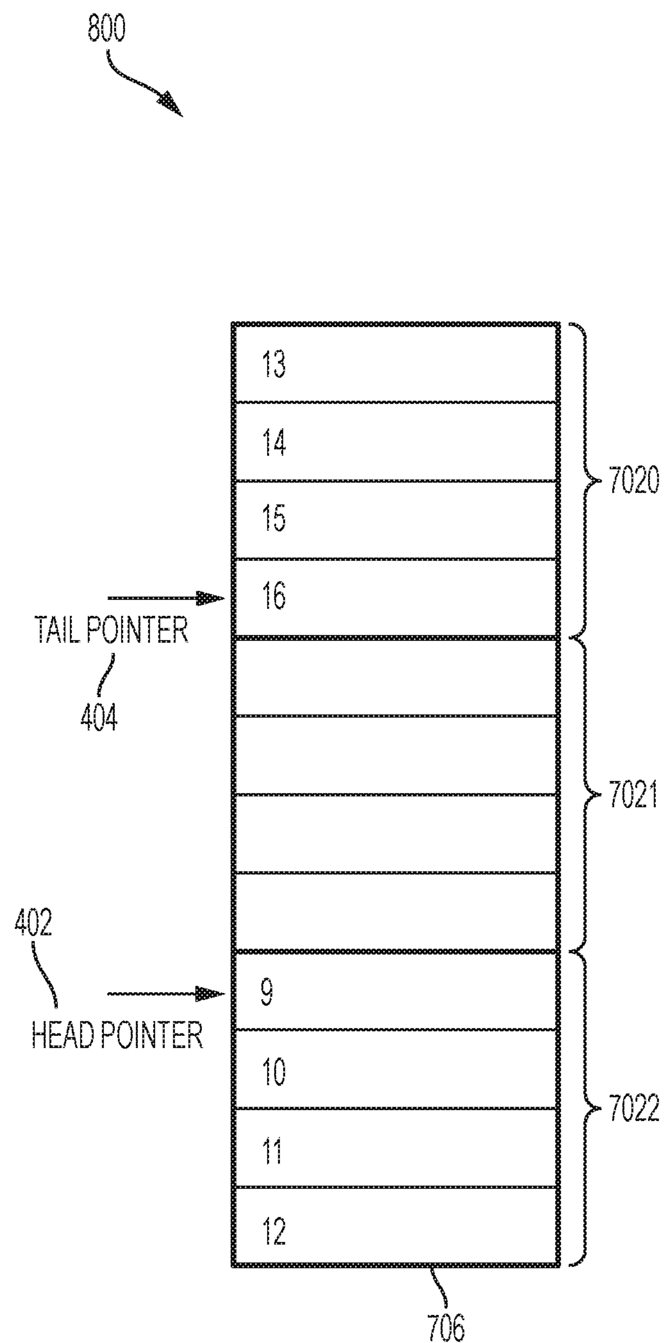
FIG. 8 is a block diagram of an issue queue in an ISU of an OoO processor for performing block based allocation and deallocation of issue queue entries in accordance with one or more embodiments of the invention.

Turning now to FIG. 8, a block diagram 800 of an issue queue 706 in an ISU of an OoO processor for performing block based allocation and deallocation of issue queue entries in accordance with one or more embodiments of the invention. As shown in FIG. 8, once instructions “1” and “3” issue and are removed from the issue queue 406 shown in FIG. 7 block 7020 can be deallocated. When instructions “13” is received from dispatch, block 7020 can be allocated and four instructions (because in this example each block contains four entries) can be added to the issue queue, followed by the allocation of block 7021 which contains four additional slots for four additional instructions. In the embodiment shown in FIG. 8, eight instructions can be dispatched before having to stall dispatch to wait for block 7022 to become available. Once stalled, dispatch can be powered down until a new block is available.

Figure 9:
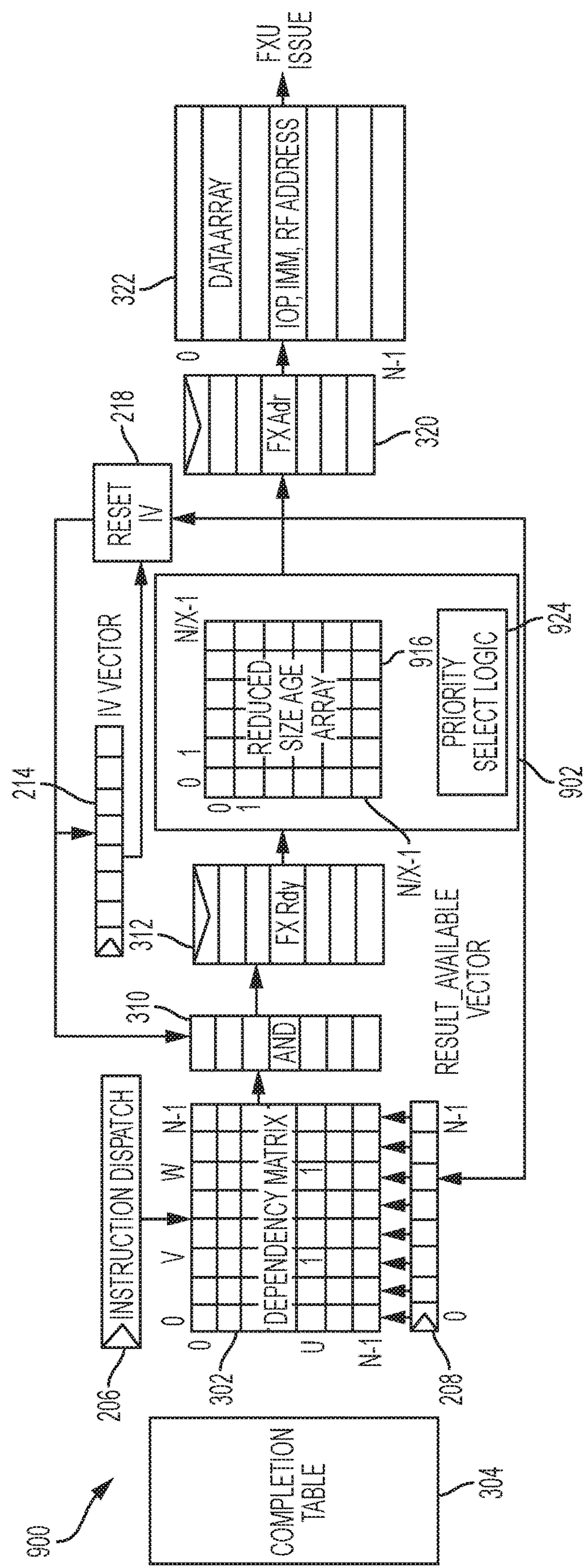
FIG. 9 is a block diagram of an issue queue with a reduced size age array in an ISU of an OoO processor for performing block based allocation and deallocation of issue queue entries in accordance with one or more embodiments of the invention.

Turning now to FIG. 9, a block diagram of an issue queue 900 in an ISU of an OoO processor for performing block based allocation and deallocation of issue queue entries is generally shown in accordance with one or more embodiments of the invention. The issue queue 900 shown in FIG. 9 contains elements of the issue queues of FIGS. 2 and 3, and includes age logic 902 that includes a reduced size age array 916 and priority select logic 924. The issue queue 900 shown in FIG. 9 can be utilized to allocate blocks of issue queue entries out of order.

The priority select logic 924 can include all, or a subset of, the priority select logic 324 of FIG. 3. The reduced size age array 916 shown in FIG. 9 has (N/X) rows and (N/X) columns, where N is the total number of instructions that can be held in the issue queue and X is the block size. The age array 916 shown in FIG. 9 tracks only the relative ages of the allocated blocks and not the relative ages of every allocated entry in the issue queue. The relative ages of instructions in the each block can be tracked by treating each block as a FIFO queue and using pointers. The blocks can have a status of allocated or deallocated. When a block is deallocated it is referred to herein as being in a pool of blocks. The pool of blocks contains deallocated blocks that can be selected, in any order (e.g., not based on their position in the issue queue) for allocation.

Figure 10:
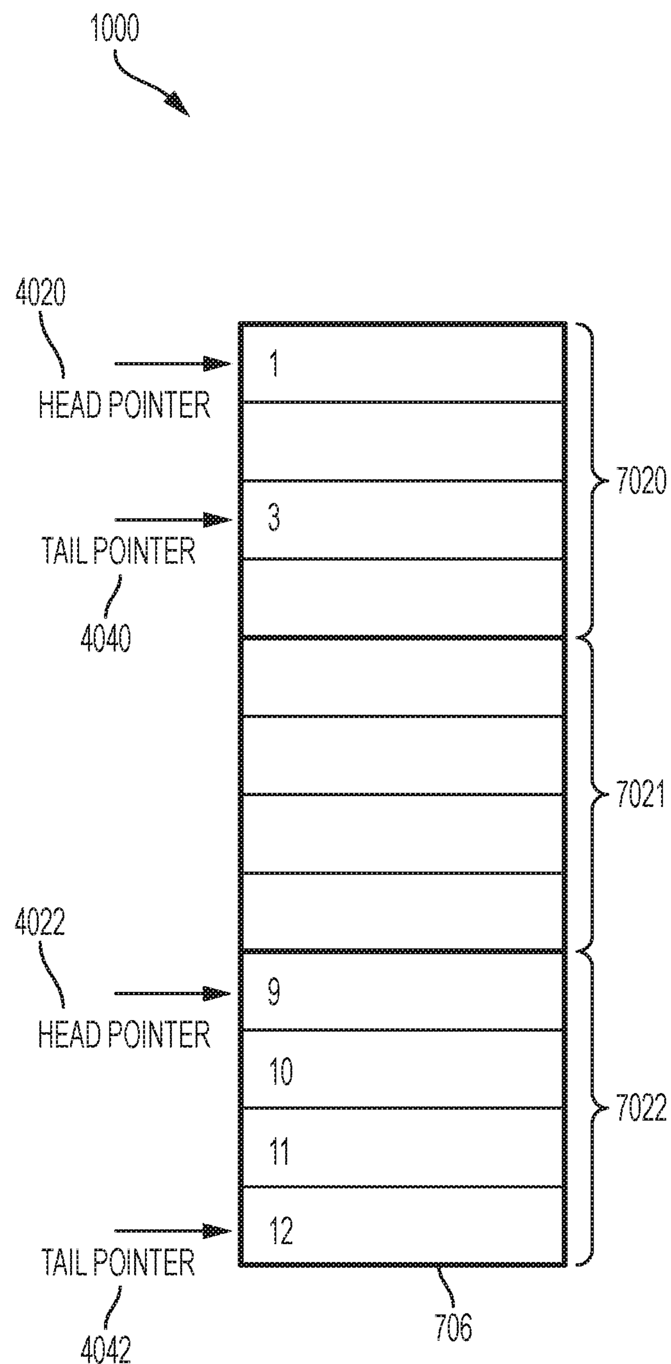
FIG. 10 is a block diagram of an issue queue in an ISU of an OoO processor for performing block based allocation and deallocation of issue queue entries in accordance with one or more embodiments of the invention.

Turning now to FIG. 10, a block diagram 1000 of an issue queue in an ISU of an OoO processor for performing block based allocation and deallocation of issue queue entries is generally shown in accordance with one or more embodiments of the invention. In a previous state, the issue queue 706 of FIG. 10 was full, similar to the issue queue 406 shown in FIG. 4. As shown in FIG. 10, instructions “1” and “4” through “8” have issued and block 7021 has been deallocated. In addition, the relative ages of blocks 7020 and 7022 are tracked by a reduced size age array and/or a linked list with block 7020 being younger than block 7022. The relative ages of the instruction within block 7020 are tracked using head pointer 4020 and tail pointer 4040. Similarly, the relative ages of the instructions within block 7022 are tracked using head pointer 4022 and tail pointer 4042. As shown in FIG. 10, when instructions “5”, “6”, “7”, and “8” are no longer valid (e.g., they have issued and are beyond the rejection point) block 7021 can be deallocated and added to a pool of blocks that are available for allocation. Because the entries are allocated and deallocated as blocks and because the blocks can be allocated in any order, once block 7021 is in the pool of free blocks, it can be allocated and used for additional instructions. Unlike, the embodiment shown in FIG. 7, the embodiment shown in FIG. 10 does not need to wait for block 7020 to be deallocated before adding additional slots to the issue queue to service newly dispatched instructions.

Figure 11:
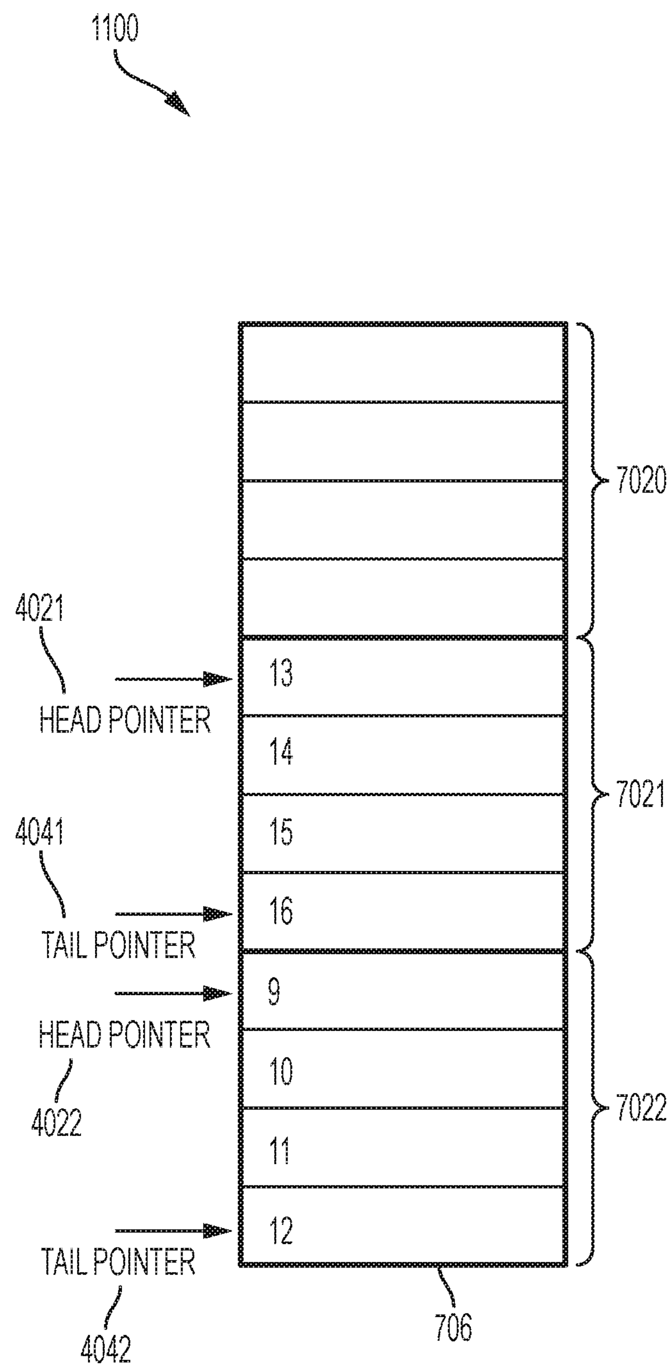
FIG. 11 is a block diagram of an issue queue in an ISU of an OoO processor for performing block based allocation and deallocation of issue queue entries in accordance with one or more embodiments of the invention.

Turning now FIG. 11, a block diagram 1100 of an issue queue 706 in an ISU of an OoO processor for performing block based allocation and deallocation of issue queue entries is generally shown in accordance with one or more embodiments of the invention. As shown in FIG. 11, once instructions "1" and "3" shown in FIG. 10 issue, block 7020 can be used for newly dispatched instructions.

In accordance with one or more embodiments of the invention, a block is free if none of the positions, or entries, in the block are occupied by a valid instruction. Each issue queue can be divided into B blocks of X q-positions such that B*X=N, the number of q-positions in the queue.

In accordance with one or more embodiments of the present invention, for a processor operating in single threaded (ST) mode, dispatched instructions can be written to q-positions in order within a block starting at the head pointer for the block. When the thread has no instructions in the issue queue, a head and tail pointer can be set to the first q-position of the first allocated block. The tail pointer can be incremented for each instruction written to the block. If the tail pointer increments beyond the end of its block, it can be set to the first position of the next block allocated to the thread. If all instructions behind the tail pointer are set to invalid after passing the reject point, the tail pointer may optionally be move back to the first invalid location. When an instruction issues and passes the reject point, a corresponding q-position valid bit or indicator can be reset to indicate that the instruction is invalid. Once all X q-positions in an allocated block are invalid, the block is returned to the free pool (i.e. entries are deallocated as a block).

In accordance with one or more embodiments of the present invention, for a processor operating in simultaneous multi-threading (SMT) mode (e.g., SMT2, SMT4) one or more blocks are selected from the pool of free blocks and allocated to the dispatching thread as needed. There is no restriction on the order in which blocks are selected from the pool of free blocks. A head and tail pointer can be maintained for each thread and dispatched instructions are written to q-positions in order within a block starting at the head pointer. Whenever a thread has no instructions in the queue, the head pointer is set to the first q-position of the first allocated block. The tail position is incremented for each written instruction and if the tail pointer increments beyond the end of a block, it is set to the first position of the next block allocated to the thread. Valid bits can be used to track whether each q-position in a block contains a valid instruction. When an instruction issues and passes the reject point, the corresponding q-position valid is reset. Once all X q-positions in an allocated block are invalid, the block is returned to the free pool Turning now to FIG. 12, a block diagram of a computer system 1200 for implementing some or all aspects of block based allocation and deallocation of issue queue entries in an issue queue of an OoO processor is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1200, such as a mobile device, personal computer, workstation, minicomputer, or mainframe computer.

Figure 12:
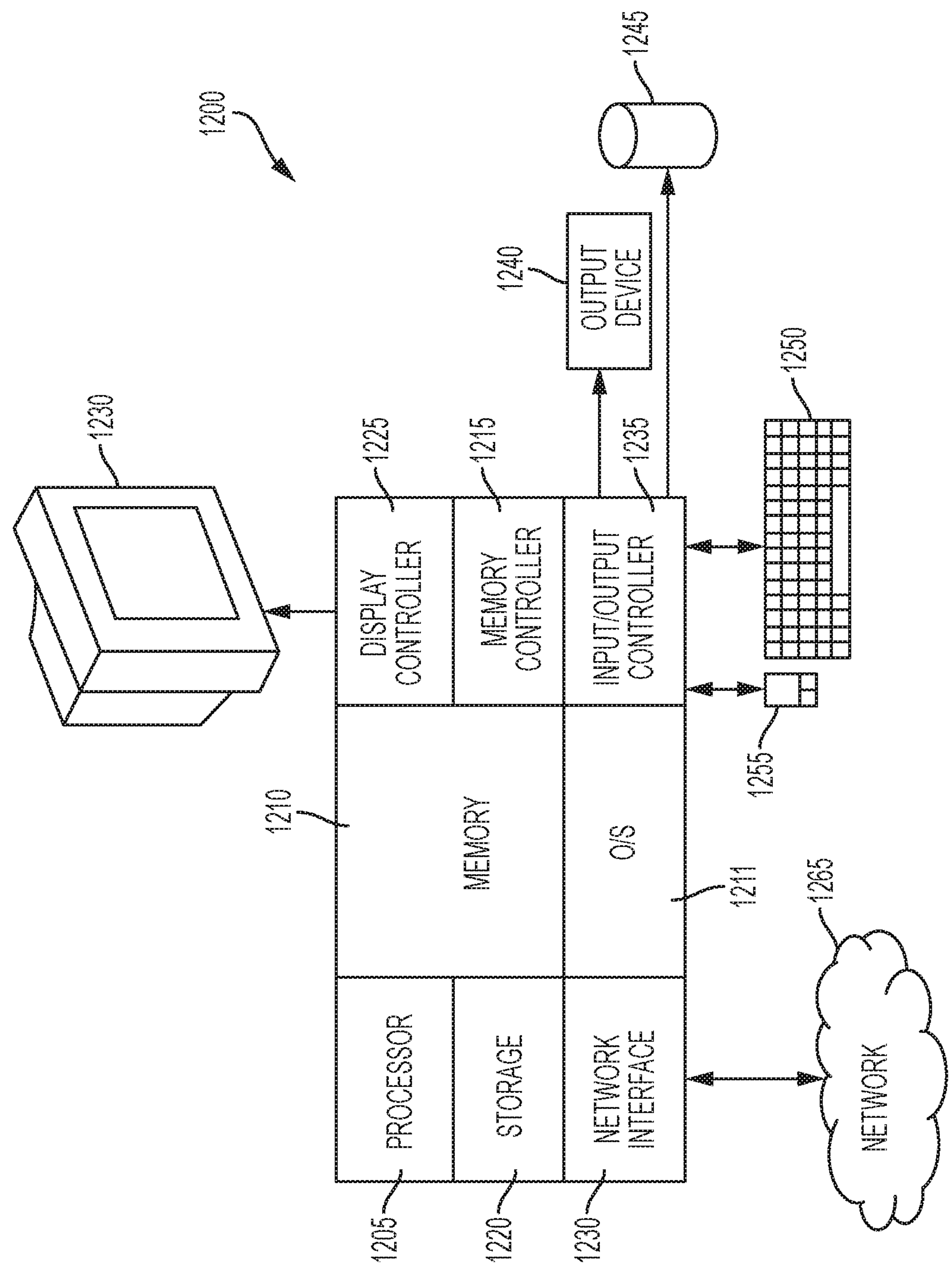
FIG. 12 is a block diagram of a computer system for implementing some or all aspects of block based allocation and deallocation of issue queue entries in an issue queue of an OoO processor in accordance with one or more embodiments of the invention.

In an exemplary embodiment, as shown in FIG. 12, the computer system 1200 includes a processor 1205, memory 1210 coupled to a memory controller 1215, and one or more input devices 1245 and/or output devices 1240, such as peripherals, that are communicatively coupled via a local I/O controller 1235. These devices 1240 and 1245 may include, for example, a printer, a scanner, a microphone, and the like. A conventional keyboard 1250 and mouse 1255 may be coupled to the I/O controller 1235. The I/O controller 1235 may be, for example, one or more buses or other wired or wireless connections, as are known in the art. The I/O controller 1235 may have additional elements, which are omitted for simplicity, such as controllers, buffers (caches), drivers, repeaters, and receivers, to enable communications.

The I/O devices 1240, 1245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1205 is a hardware device for executing hardware instructions or software, particularly those stored in memory 1210. The processor 1205 may be a custom made or commercially available processor, a central processing unit (CPU), an auxiliary processor among several processors associated with the computer system 1200, a semiconductor based microprocessor (in the form of a microchip or chip set), a macroprocessor, or other device for executing instructions. The processor 1205 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1210 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, or other types of storage media. Note that the memory 1210 may have a distributed architecture, where various components are situated remote from one another but may be accessed by the processor 1205.

The instructions in memory 1210 may include one or more separate programs, each of which comprises an ordered listing of executable instructions for implementing logical functions. In the example of FIG. 12, the instructions in the memory 1210 include a suitable operating system (OS) 1211. The operating system 1211 essentially may control the execution of other computer programs and provides scheduling, input-output control, file and data management, memory management, and communication control and related services.

Additional data, including, for example, instructions for the processor 1205 or other retrievable information, may be stored in storage 1220, which may be a storage device such as a hard disk drive or solid state drive. The stored instructions in memory 1210 or in storage 1220 may include those enabling the processor to execute one or more aspects of the dispatch systems and methods of this disclosure.

The computer system 1200 may further include a display controller 1225 coupled to a display 1230. In an exemplary embodiment, the computer system 1200 may further include a network interface 1260 for coupling to a network 1265. The network 1265 may be an IP-based network for communication between the computer system 1200 and an external server, client and the like via a broadband connection. The network 1265 transmits and receives data between the computer system 1200 and external systems. In an exemplary embodiment, the network 1265 may be a managed IP network administered by a service provider. The network 1265 may be implemented in a wireless fashion, e.g., using wireless protocols and technologies, such as WiFi, WiMax, etc. The network 1265 may also be a packet-switched network such as a local area network, wide area network, metropolitan area network, the Internet, or other similar type of network environment. The network 1265 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing cognitive advertising that is triggered by weather data as described herein can be embodied, in whole or in part, in computer program products or in computer systems 1200, such as that illustrated in FIG. 12.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

tracking relative ages of instructions in an issue queue of an out-of-order (OoO) processor, the tracking comprising:

grouping entries in the issue queue into a pool of fixed sized blocks, each block containing a plurality of contiguous entries that are configured to be allocated and deallocated as a single unit, each entry in the plurality of entries configured to store an instruction;

selecting, in any order, blocks from the pool of blocks for allocation;

allocating the selected blocks;

tracking relative ages of the allocated blocks based at least in part on an order that the blocks are allocated;

configuring each allocated block as a first-in-first-out (FIFO) queue of entries, each allocated block configured to add instructions to the block in a sequential order and to remove instructions from the block in any order including a non-sequential order; and tracking relative ages of instructions within each allocated block, wherein upon allocation of a block, entries in the block are available to store instructions received from a dispatch unit, and wherein upon deallocation of the block, the block is put back into the pool and entries in the block are no longer available to store instructions received from the dispatch unit.

2. The computer-implemented method of claim 1, wherein an age array is utilized for tracking relative ages of the allocated blocks.

3. The computer-implemented method of claim 1, wherein a linked list is utilized for tracking relative ages of the allocated blocks.

4. The computer-implemented method of claim 1, further comprising, for each of the allocated blocks, maintaining a tail pointer to a location of a last instruction added to the allocated block, wherein upon addition of a new instruction to the allocated block, the tail pointer is updated to point to a next sequential location in the allocated block and the new instruction is inserted at the next sequential location in the allocated block.

5. The computer-implemented method of claim 4, further comprising, for each of the allocated blocks, maintaining a head pointer to a location of an oldest instruction in the allocated block, wherein upon removal of the oldest instruction from the allocated block the head pointer is updated to point to a next sequential location in the allocated block.

6. The computer-implemented method of claim 1, wherein a new block is selected from the pool of blocks and allocated based at least in part on receiving a new instruction to be added to the issue queue and to determining that the new instruction cannot be added to one of the previously allocated blocks.

7. The computer-implemented method of claim 1, wherein an allocated block is deallocated and added to the pool of blocks based at least in part on none of the entries in the allocated block corresponding to a valid instruction.

8. The computer-implemented method of claim 1, wherein entries in each of the allocated blocks correspond to a single thread.

9. The computer-implemented method of claim 1, wherein entries in a first allocated block correspond to a first thread and entries in a second allocated block correspond to a second thread.

10. The computer-implemented method of claim 9, wherein the relative ages of allocated blocks having entries corresponding to the first thread are tracked separately from the relative ages of allocated blocks having entries corresponding to the second thread.

11. A system comprising:

a memory having computer readable instructions; and one or more processors for executing the computer readable instructions, the computer readable instructions controlling the one or more processors to perform operations comprising:

tracking relative ages of instructions in an issue queue of an out-of-order (OoO) processor, the tracking comprising:

grouping entries in the issue queue into a pool of fixed sized blocks, each block containing a plurality of contiguous entries that are configured to be allocated and deallocated as a single unit, each entry in the plurality of entries configured to store an instruction;

selecting, in any order, blocks from the pool of blocks for allocation;

allocating the selected blocks;

tracking relative ages of the allocated blocks based at least in part on an order that the blocks are allocated;

configuring each allocated block as a first-in-first-out (FIFO) queue of entries, each allocated block configured to add instructions to the block in a sequential order and to remove instructions from the block in any order including a non-sequential order; and tracking relative ages of instructions within each allocated block, wherein upon allocation of a block, entries in the block are available to store instructions received from a dispatch unit, and wherein upon deallocation of the block, the block is put back into the pool and entries in the block are no longer available to store instructions received from the dispatch unit.

12. The system of claim 11, wherein an age array is utilized for tracking relative ages of the allocated blocks.

13. The system of claim 11, wherein a linked list is utilized for tracking relative ages of the allocated blocks.

14. The system of claim 11, wherein the operations further comprise, for each of the allocated blocks, maintaining a tail pointer to a location of a last instruction added to the allocated block, wherein upon addition of a new instruction to the allocated block, the tail pointer is updated to point to a next sequential location in the allocated block and the new instruction is inserted at the next sequential location in the allocated block.

15. The system of claim 11, wherein a new block is selected from the pool of blocks and allocated based at least in part on receiving a new instruction to be added to the issue queue and to determining that the new instruction cannot be added to one of the previously allocated blocks.

16. The system of claim 11, wherein an allocated block is deallocated and added to the pool of blocks based at least in part on none of the entries in the allocated block corresponding to a valid instruction.

17. The system of claim 11, wherein entries in each of the allocated blocks correspond to a single thread.

18. The system of claim 11, wherein entries in a first allocated block correspond to a first thread and entries in a second allocated block correspond to a second thread.

19. The system of claim 18, wherein the relative ages of allocated blocks having entries corresponding to the first thread are tracked separately from the relative ages of allocated blocks having entries corresponding to the second thread.

20. A computer program product comprising a non-transitory computer readable storage medium having program instructions embodied therewith, the program instructions executable by a processor to cause the processor to perform operations comprising:

tracking relative ages of instructions in an issue queue of an out-of-order (OoO) processor, the tracking comprising:

grouping entries in the issue queue into a pool of fixed sized blocks, each block containing a plurality of contiguous entries that are configured to be allocated and deallocated as a single unit, each entry in the plurality of entries configured to store an instruction;

selecting, in any order, blocks from the pool of blocks for allocation;

allocating the selected blocks;

tracking relative ages of the allocated blocks based at least in part on an order that the blocks are allocated;

configuring each allocated block as a first-in-first-out (FIFO) queue of entries, each allocated block configured to add instructions to the block in a sequential order and to remove instructions from the block in any order including a non-sequential order; and tracking relative ages of instructions within each allocated block, wherein upon allocation of a block, entries in the block are available to store instructions received from a dispatch unit, and wherein upon deallocation of the block, the block is put back into the pool and entries in the block are no longer available to store instructions received from the dispatch unit.

* * * * *